US011136091B2

(12) United States Patent
Chang (10) Patent No.: US 11,136,091 B2
(45) Date of Patent: Oct. 5, 2021

(54) HYDRAULIC-TYPE TIME-DIFFERENCE BRAKE APPARATUS

(71) Applicant: GINDA NEW-TECH CO., LTD., Kaohsiung (TW)

(72) Inventor: Jui-Lung Chang, Kaohsiung (TW)

(73) Assignee: GINDA NEW-TECH CO., LTD., Kaohsiung (TW)

( * ) Notice: Subject to any disclaimer, the term of this patent is extended or adjusted under 35 U.S.C. 154(b) by 0 days.

(21) Appl. No.: 16/319,802

(22) PCT Filed: Aug. 3, 2016

(86) PCT No.: PCT/CN2016/093010
§ 371 (c)(1),
(2) Date: Jan. 22, 2019

(87) PCT Pub. No.: WO2018/023471
PCT Pub. Date: Feb. 8, 2018

(65) Prior Publication Data
US 2019/0263471 A1    Aug. 29, 2019

(51) Int. Cl.
*B62L 3/08* (2006.01)
*B62L 3/02* (2006.01)

(52) U.S. Cl.
CPC ............ *B62L 3/08* (2013.01); *B62L 3/023* (2013.01)

(58) Field of Classification Search
CPC .......... B62L 3/08; B62L 3/023; B60T 11/101; B60T 7/102; B60T 11/224; B60T 11/046
(Continued)

(56) References Cited

U.S. PATENT DOCUMENTS 5,544,946 A * 8/1996 Toyoda .................. B60T 8/261
                                                                188/106 P
6,070,949 A   6/2000 Hariu et al. ................. 303/9.61
(Continued)

FOREIGN PATENT DOCUMENTS

| CN | 2863626 Y | 1/2007 |
| CN | 101108644 A | 1/2008 |
| CN | 103707987 A | 4/2014 |
| CN | 103963905 A | 8/2014 |
| JP | H08-133041 | 5/1996 |
| JP | WO-2017-190280 A1 * | 9/2017 |

OTHER PUBLICATIONS

Translation of CN 2863636 obtained from website: https://worldwide.espacenet.com on May 27, 2020.*
(Continued)

*Primary Examiner* — Pamela Rodriguez
(74) *Attorney, Agent, or Firm* — J.C. Patents (57) ABSTRACT

A hydraulic-type time-difference brake apparatus includes at least a driving device, a housing, a first pump mechanism and a second pump mechanism as main components combined together. The driving device is provided with a first driving rod, a second driving rod, a brake starting member and a housing, one end of the first driving rod is connected to the brake starting member, and the other end is connected to the first pump mechanism, the first driving rod can push the first pump mechanism and output the first braking force to the rear wheel brake; one end of the second driving rod is connected to the brake starting member by a sliding device, and the other end is connected to the second pump mechanism, the second driving rod can push the second pump mechanism and output the second braking force to the front wheel brake. The sliding process of the sliding device can delay the time the brake starting member activates the second driving rod, so that the start time between the first driving rod and the second driving rod will have a time difference. In this way, the driver can cause the rear wheel brake and the front wheel brake to generate a time-difference (Continued)

brake by only one braking operation, the rear wheel brake can first generate a braking force on the rear wheel to reduce the speed of the rear wheel, then the front wheel brake will generate a larger braking force on the front wheel more than the rear wheel after a time difference to improve the safety of the vehicle.

15 Claims, 7 Drawing Sheets

(58) Field of Classification Search
USPC ............ 188/344, 345, 349, 106 P; 303/9.61, 303/9.64, 9.75, 13, 14, 137
See application file for complete search history.

(56) References Cited

U.S. PATENT DOCUMENTS

| | | | |
|---|---|---|---|
| 6,390,566 B1 * | 5/2002 | Matsuno | B60T 8/26 188/345 |
| 6,772,864 B1 * | 8/2004 | Luh | B60T 11/046 180/244 |
| 2019/0118787 A1 * | 4/2019 | Chang | B60T 11/046 |
| 2019/0232929 A1 * | 8/2019 | Chang | B62L 3/08 |

OTHER PUBLICATIONS

The International Search Report of corresponding International PCT Application No. PCT/CN2016/093010, dated May 2, 2017.

* cited by examiner

HYDRAULIC-TYPE TIME-DIFFERENCE BRAKE APPARATUS

CROSS-REFERENCE TO RELATED APPLICATION

This application is a national phase application of international application No. PCT/CN2016/093010 filed on Aug. 3, 2016. The content of the prior application is hereby incorporated by reference in its entirety.

BACKGROUND OF THE INVENTION

1. Field of the Invention

This invention relates to a hydraulic-type time-difference brake apparatus, particularly to a hydraulic-type brake apparatus which the rear wheel brake and the front wheel brake of the vehicle can generate a brake action with a time difference by one brake action of the driver, and the final braking force of the front wheel brake is greater than the braking force of the rear wheel brake to improve the braking performance and safety of the vehicle.

2. Description of the Prior Art

At present, the brake systems of various vehicles, such as the front and rear wheel brakes of automobiles, are used a hydraulic pump to simultaneously drive the oil pressure tubes of the front wheel brakes and rear wheel brakes to generate braking force. The distance between the rear brake and the hydraulic pump is greater than the distance between the front brake and the hydraulic pump, since the hydraulic pump is placed in front of the car. In this way, when the driver starts the brakes, although the hydraulic pump simultaneously drives the hydraulic tubes of the front and rear wheel brakes of the vehicle, the starting time of the rear wheel brake will be slower than the starting time of the front wheel brake because of the difference in the distance between the hydraulic tubes of the front wheel brake and the hydraulic tubes of the rear wheel brake. Moreover, most vehicles use rear wheel transmission, when the driver starts the brake, the front wheel will generate braking force and the rear wheel will continue to output power in the initial time, this will easily lead to the risk of vehicle slippage.

In addition, with regard to a rideable vehicle, such as a motorcycle or a bicycle, etc., the brake operating components of the front and rear wheels of the rideable vehicle are respectively provided on both sides of the handle, and the braking action of the front and rear wheel is controlled by the rider. When the rider drives the front wheel brake first, the rear wheel will continue to output power, so that an excessive speed difference between the front and rear wheels will be generated, this will easily lead to an accident of rider spillover, resulting in irreparable results.

SUMMARY OF THE INVENTION

If the vehicles have the function of adjusting the time difference between the front wheel brakes and rear wheel brake, the rear wheel brake can be driven first when the brake is started, and then the front wheel brake will be driven later, so that the brake problem of the foregoing vehicles can be solved, and the safety of brakes in various vehicles can be improved.

For this reason, the inventor of this invention, having much experience in designing and manufacturing brake device and its related products, understands and researches the brake problems of various vehicles and hence devised this invention.

The objective of this invention is to offer a hydraulic-type time-difference brake apparatus, which utilizes a first driving rod of a driving device to drive a first pump mechanism and output a first braking force to the rear wheel brake of the vehicle. And after a short time difference, the second driving rod of the driving device will drive the second pump mechanism and outputs a second braking force to the front wheel brake of the vehicle. In this way, the driver can cause the rear wheel brake and the front wheel brake to generate a time-difference brake by only one braking operation, the rear wheel brake can first generate a braking force on the rear wheel to reduce the speed of the rear wheel, then the front wheel brake will generate a larger braking force on the front wheel more than the rear wheel after a time difference to improve the safety of the vehicle.

The hydraulic-type time-difference brake apparatus in the present invention, among which the first driving rod and the second driving rod of the driving device may directly connect the braking driving member, and the driver can directly operate the braking driving member, so that the braking force output by the first pump mechanism and the second pump mechanism has a time difference.

The hydraulic-type time-difference brake apparatus in the present invention, among which the distance that the brake starting member pushes the first driving rod to move is different from the distance that the brake starting member pushes the second driving rod to move, so the braking forces output by the first driving rod and the second driving rod are different.

The hydraulic-type time-difference brake apparatus in the present invention, among which a sliding device is provided between the second driving rod and the brake driving member, the sliding process of the sliding device can delay the time the brake starting member activates the second driving rod, so that the start time between the first driving rod and the second driving rod will have a time difference;

The hydraulic-type time-difference brake apparatus in the present invention, among which said first pump mechanism is provided with a first piston, the upper end of the first piston is pressed against the lower end of the first driving rod; said second pump mechanism is provided with a second piston, the upper end of the second piston is pressed against the lower end of the second driving rod.

The hydraulic-type time-difference brake apparatus in the present invention, among which the size of the first chamber for arranging the first piston of the first pump mechanism is different from the size of the second chamber for arranging the second piston of the second pump mechanism.

The hydraulic-type time-difference brake apparatus in the present invention, among which said first chamber is provided with a first replenishing device, the first replenishing device is provided with a first regulating valve, a first connecting duct is formed between the first chamber and the first replenishing device, said first regulating valve can adjust or supplement the hydraulic fluid in the first chamber, the first replenishing device is provided with a first fluid storage tank, a gas temporary storage space is disposed in the first fluid storage tank, so that the air bubbles generated from the first chamber can be transported to the gas temporary storage space of the first fluid storage tank through the first output duct and the first regulating valve to maintain the quality and temperature of the hydraulic fluid in the first chamber.

The hydraulic-type time-difference brake apparatus in the present invention, among which said second chamber is provided with a second replenishing device, the second replenishing device is provided with a second regulating valve, a second connecting duct is formed between the second chamber and the second replenishing device, said second regulating valve can adjust or supplement the hydraulic fluid in the second chamber, the second replenishing device is provided with a second fluid storage tank, a gas temporary storage space is disposed in the second fluid storage tank, so that the air bubbles generated from the second chamber can be transported to the gas temporary storage space of the second fluid storage tank through the second output duct and the second regulating valve to maintain the quality and temperature of the hydraulic fluid in the second chamber.

The hydraulic-type time-difference brake apparatus in the present invention can provide at least one set of hydraulic-type time-difference brake apparatus on the vehicle, when the vehicle is equipped with two sets of hydraulic-type time-difference brake apparatuses, the first output ducts of the first pump mechanisms of the two hydraulic-type time-difference brake apparatuses are connected together by a connection valve, and the second output ducts of the second pump mechanisms of the two hydraulic-type time-difference brake apparatuses are connected together by a connection valve, so the braking forces can be output to the rear wheel brake and front wheel brake at the same time or separately.

BRIEF DESCRIPTION OF DRAWINGS

This invention will be better understood by referring to the accompanying drawings, wherein.

DETAILED DESCRIPTION OF THE PREFERRED EMBODIMENT

As shown in FIGS. 1 to 7, the hydraulic-type time-difference brake apparatus in the present invention includes at least a driving device 1, a housing 2, a first pump mechanism 3 and a second pump mechanism 4 as main components combined together.

The first embodiment as shown in FIGS. 1 to 4, said driving device 1 is provided with a first driving rod 10, a second driving rod 11 and a brake starting member 14. The upper end 100 of said first driving rod 10 is provided with a shaft 101, said brake starting member 14 is provided with a driving portion 140, and the shaft 101 is coupled with the driving portion 140 of the brake starting member 14. Said first driving rod 10 and the shaft 101 are a movable structure, so that the brake starting member 14 can drive the first driving rod 10 to move by the shaft 101.

Said first driving rod 10 is provided with a first rod holder 12 and a through hole 120 is formed on the first rod holder 12, said first driving rod 10 is passed through the through hole 120 of the first rod holder 12, and the lower end of the first driving rod 10 is connected to the first pump mechanism 3. Said first rod holder 12 can be made of a flexible material such as rubber or silicone, so that an optimum sealing effect can be achieved between the first driving rod 10 and the housing 2.

Figure 2:
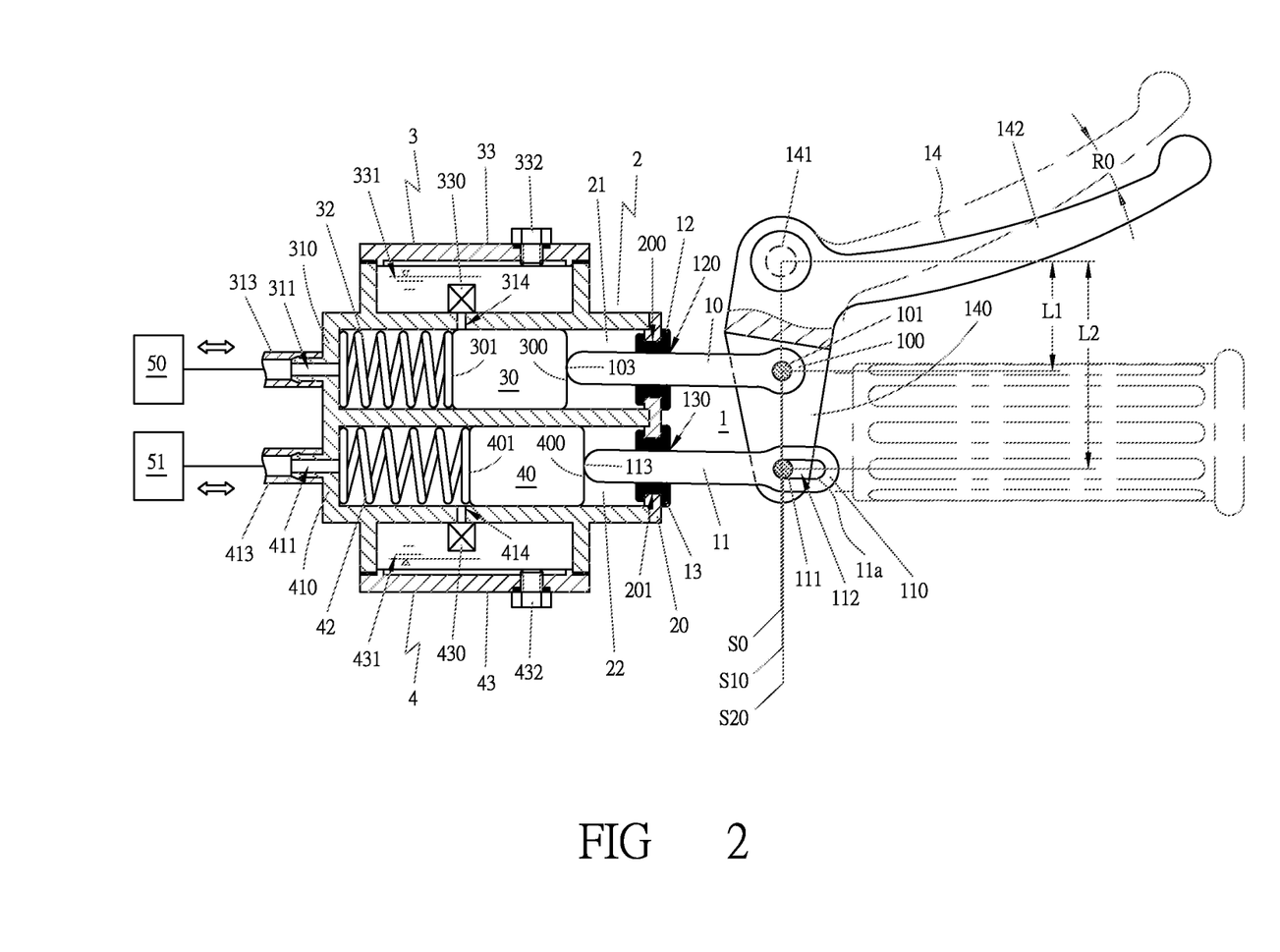
FIG. 2 is a second schematic view of the operating state of the first embodiment in the present invention, and showing a state in which the driving device outputs the first braking force.
Figure 3:
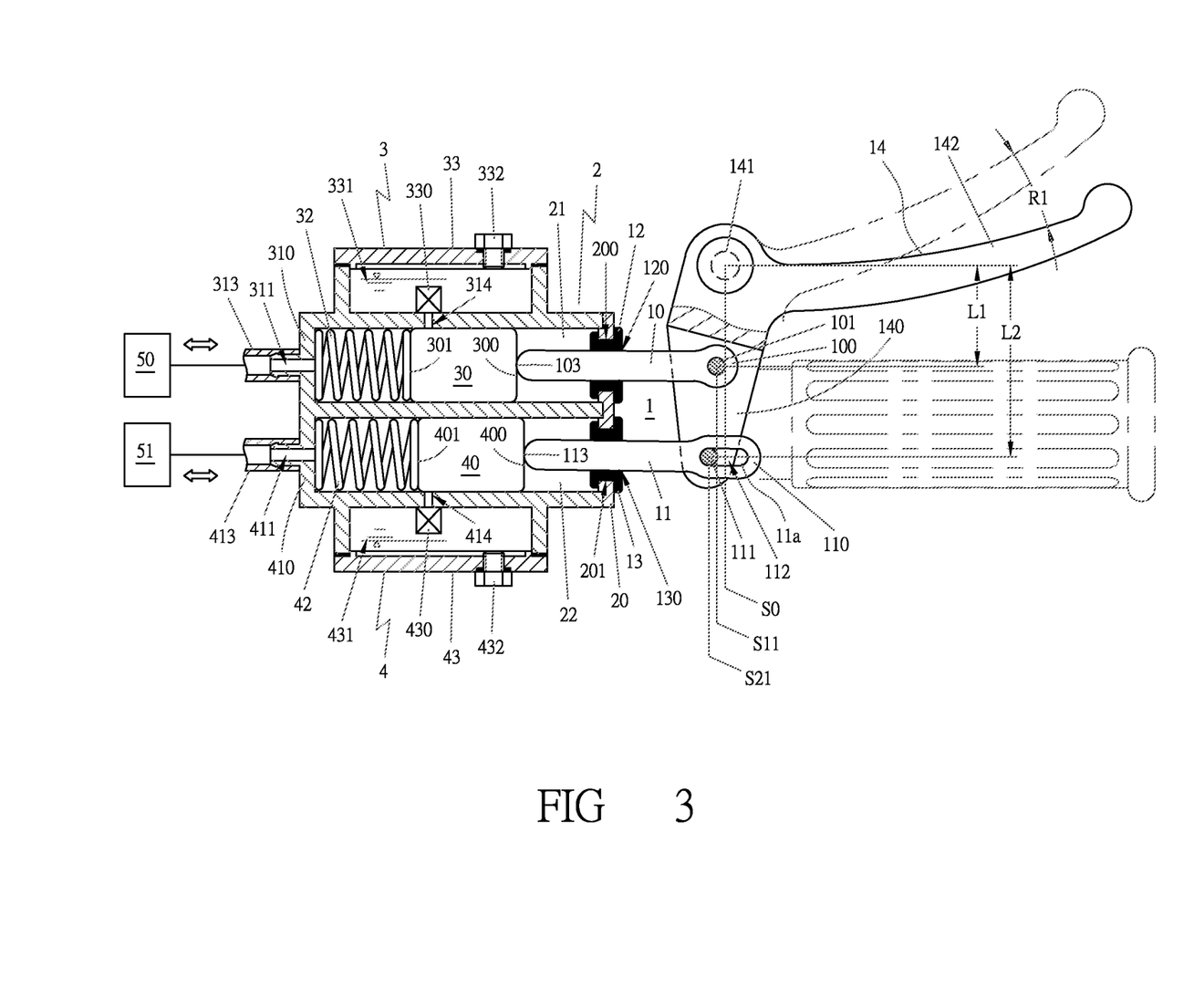
FIG. 3 is a third schematic view of the operating state of the first embodiment in the present invention, and showing a state in which the driving device simultaneously outputs the first braking force.
Figure 4:
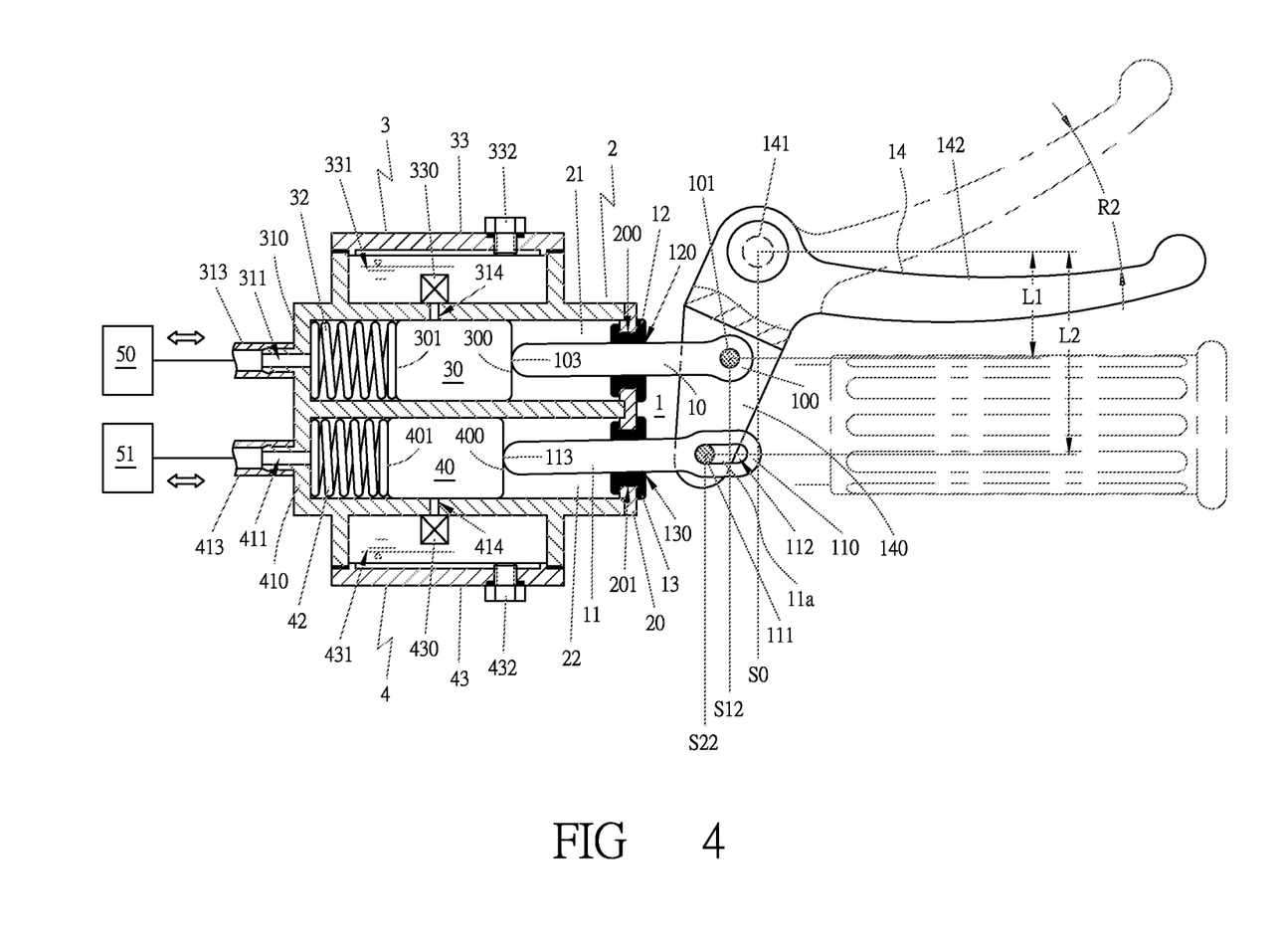
FIG. 4 is a fourth schematic view of the operating state of the first embodiment in the present invention, and showing a state in which the driving device increases the second braking force.

A sliding device 11a is mounted between the second driving rod 11 and the brake starting element 14, the sliding device 11a is provided with a slotted hole 112 at the upper end 110 of the second driving rod 11, and a sliding shaft 111 is arranged in the slotted hole 112. Said sliding shaft 111 is coupled to the driving portion 140 of the brake starting member 14 to each other, so that the brake starting member 14 can drive the second driving rod 11 to move by the sliding shaft 111. When the brake starting member 14 starts to move, the sliding path of the sliding device 11a will cause the second driving rod 11 to be driven later than the first driving rod 10 (as shown in FIGS. 2 to 4), so a time difference of starting time will be generated between the first pump mechanism 3 and a second pump mechanism 4. Said second driving rod 11 is provided with a second rod holder 13 and a through hole 130 is formed on the second rod holder 13, said second driving rod 11 is passed through the through hole 130 of the second rod holder 13, and the lower end of the second driving rod 11 is connected to the second pump mechanism 4. Said second rod holder 13 can be made of a flexible material such as rubber or silicone, so that an optimum sealing effect can be achieved between the second driving rod 11 and the housing 2.

Figure 6:
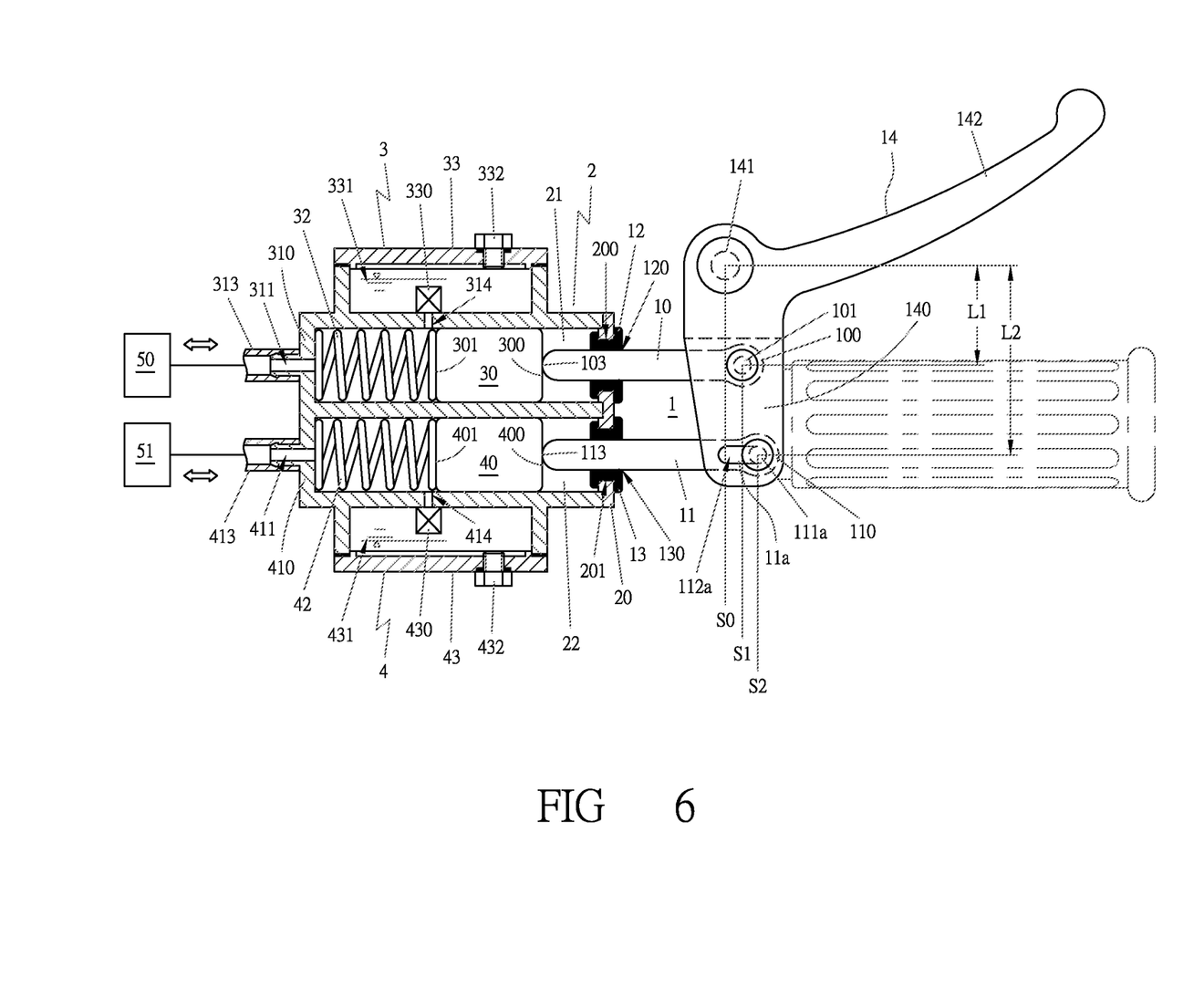
FIG. 6 is a schematic view of the second embodiment in the present invention, and showing a state in which the driving device is not activated.

The second embodiment as shown in FIG. 6, the difference between the second embodiment and the first embodiment is that the slotted hole 112a is provided on the driving portion 140 of the brake starting member 14, the sliding shaft 111a is arranged in the slotted hole 112a, the sliding shaft 111a is coupled to the upper end 110 of the second driving rod 11 to each other, so that the brake starting member 14 can drive the second driving rod 11 to move by the slotted hole 112a. When the brake starting member 14 starts to move, the sliding path of the sliding device 11a will cause the second driving rod 11 to be driven later than the first driving rod 10, so that a time difference of starting time will be generated between the first pump mechanism 3 and a second pump mechanism 4.

The brake starting element 14 of the driving device 1 of the present invention may be integrated with the existing equipment of the vehicle or as a separate device depending on the characteristics of the vehicle and the budget of the user. As shown in FIGS. 1 to 4, the present invention is an embodiment of a hand-press brake driving device commonly used in two-wheeled vehicles, and the actual use thereof is not limited thereto. Said first driving rod 10 uses the shaft 101 as a pivot point, said second driving rod 11 uses the sliding shaft 111 as a pivot point, so the first driving rod 10 and the second driving rod 11 can move in conjunction with the rotational swing of the driving portion 140 of the brake starting member 14 to drive the first pump mechanism 3 and the second pump mechanism 4 to operate, respectively. Said brake starting member 14 is provided with a lever shaft 141, and a pressing handle 142 is mounted on one side of the lever shaft 141, the lever shaft 141 is a leverage point between the pressing handle 142 and the driving portion 140. When the pressing handle 142 is pressed by the rider, the driving portion 140 will be caused to generate a corresponding arc displacement R0-R2 (as shown in FIGS. 2 to 4). Since the first length L1 between the shaft 101 of the first driving rod 10 and the lever shaft 141 is different from the second length L2 between the sliding shaft 111 of the second drive rod 11 and the lever shaft 141, the arc displacement generated by the two is also different, this is why the braking forces of the first driving lever 10 and the second driving lever 11 outputted to the first pump mechanism 3 and the second pump mechanism 4 are different. In addition, when said second length L2 is greater than said first length L1, the arc displacement generated by the sliding shaft 111 of the second driving rod 11 is greater than the arc displacement generated by the shaft 101 of the first driving rod 10, and the moment of force generated by the sliding shaft 111 of the second driving rod 11 is greater than the moment of force generated by the shaft 101 of the first driving rod 10.

As shown in FIGS. 1 to 4, the upper wall 20 of the housing 2 is provided with a first rod hole 200, the first rod holder 12 of the first driving rod 10 is mounted in the first rod hole 200; the upper wall 20 of the housing 2 is provided with a second rod hole 201, the second rod holder 13 of the second driving rod 11 is mounted in the second rod hole 201. Said housing 2 is provided with a first chamber 21, the first piston 30 and the first elastic member 32 of said first pump mechanism 3 are mounted therein, and the upper end 300 of the first piston 30 is pressed against the lower end of the first driving rod 10. Said housing 2 is provided with a second chamber 22, the second piston 40 and the second elastic member 42 of said second pump mechanism 4 are mounted therein, and the upper end 400 of the second piston 40 is pressed against the lower end of the second driving rod 11.

As shown in FIGS. 1 to 4, said first pump mechanism 3 is provided with a first piston 30 which moves within the first chamber 21 of the housing 2. Said first chamber 21 is internally filled with hydraulic fluid, and the first piston 30 is provided with an oil seal or an O-ring. A first elastic member 32, such as a compression spring, is disposed in the first chamber 21, and the first elastic member 32 is located between the lower end 301 of the first piston 30 and the lower wall 310 of the first chamber 21. The lower wall 310 of said first chamber 21 is formed with a first hole 311, and the first hole 311 is provided with a first output duct 313, so that the first output pipe 313 can output the hydraulic fluid inside the first chamber 21 to the rear wheel brake 50, and to drive the rear wheel brake 50 to generate a braking force.

As shown in FIGS. 1 to 4, said first chamber 21 is provided with a first replenishing device 33, the first replenishing device 33 can be disposed on the outer side of the casing 2, and the first replenishing device 33 can be made of plastic or other light-transmissive material, so that the user can observe the amount of hydraulic fluid of the first replenishing device 33. Said first replenishing device 33 is provided with a first regulating valve 330, and a first connecting duct 314 is formed between the first chamber 21 and the first replenishing device 33, said first regulating valve 330 can adjust or supplement the hydraulic fluid in the first chamber 21. The first replenishing device 33 is provided with a first fluid storage tank 331. The first fluid storage tank 331 is provided with a first plug 332, and the hydraulic fluid in the first fluid storage tank 331 can be replenished or replaced through the first plug 332. A gas temporary storage space is disposed in the first fluid storage tank 331, so that the air bubbles generated from the first chamber 21 can be transported to the gas temporary storage space of the first fluid storage tank 330 through the first output duct 314 and the first regulating valve 330 to maintain the quality and temperature of the hydraulic fluid in the first chamber 21.

As shown in FIGS. 1 to 4, said second pump mechanism 4 is provided with a second piston 40 which moves within the second chamber 22 of the housing 2. Said second chamber 22 is internally filled with hydraulic fluid, and the second piston 40 is provided with an oil seal or an O-ring. A second elastic member 42, such as a compression spring, is disposed in the second chamber 22, and the second elastic member 42 is located between the lower end 401 of the second piston 40 and the lower wall 410 of the second chamber 22. The lower wall 410 of said second chamber 22 is formed with a second hole 411, and the second hole 411 is provided with a second output duct 413, so that the second output pipe 413 can output the hydraulic fluid inside the second chamber 22 to the front wheel brake 51, and to drive the front wheel brake 51 to generate a braking force.

As shown in FIGS. 1 to 4, said second chamber 22 is provided with a second replenishing device 43, the second replenishing device 43 can be disposed on the outer side of the casing 2, and the second replenishing device 43 can be made of plastic or other light-transmissive material, so that the user can observe the amount of hydraulic fluid of the second replenishing device 43. Said second replenishing device 43 is provided with a second regulating valve 430, and a second connecting duct 414 is formed between the second chamber 22 and the second replenishing device 43, said second regulating valve 430 can adjust or supplement the hydraulic fluid in the second chamber 22. The second replenishing device 43 is provided with a second fluid storage tank 431. The second fluid storage tank 431 is provided with a second plug 432, and the hydraulic fluid in the second fluid storage tank 431 can be replenished or replaced through the second plug 432. A gas temporary storage space is disposed in the second fluid storage tank 431, so that the air bubbles generated from the second chamber 22 can be transported to the gas temporary storage space of the second fluid storage tank 430 through the second output duct 414 and the second regulating valve 430 to maintain the quality and temperature of the hydraulic fluid in the second chamber 22.

As shown in FIGS. 1 to 4, in the first embodiment, the size of the first chamber 21 for arranging the first piston 30 of the first pump mechanism 3 is the same as the size of the second chamber 22 for arranging the second piston 40 of the second pump mechanism 4.

Figure 7:
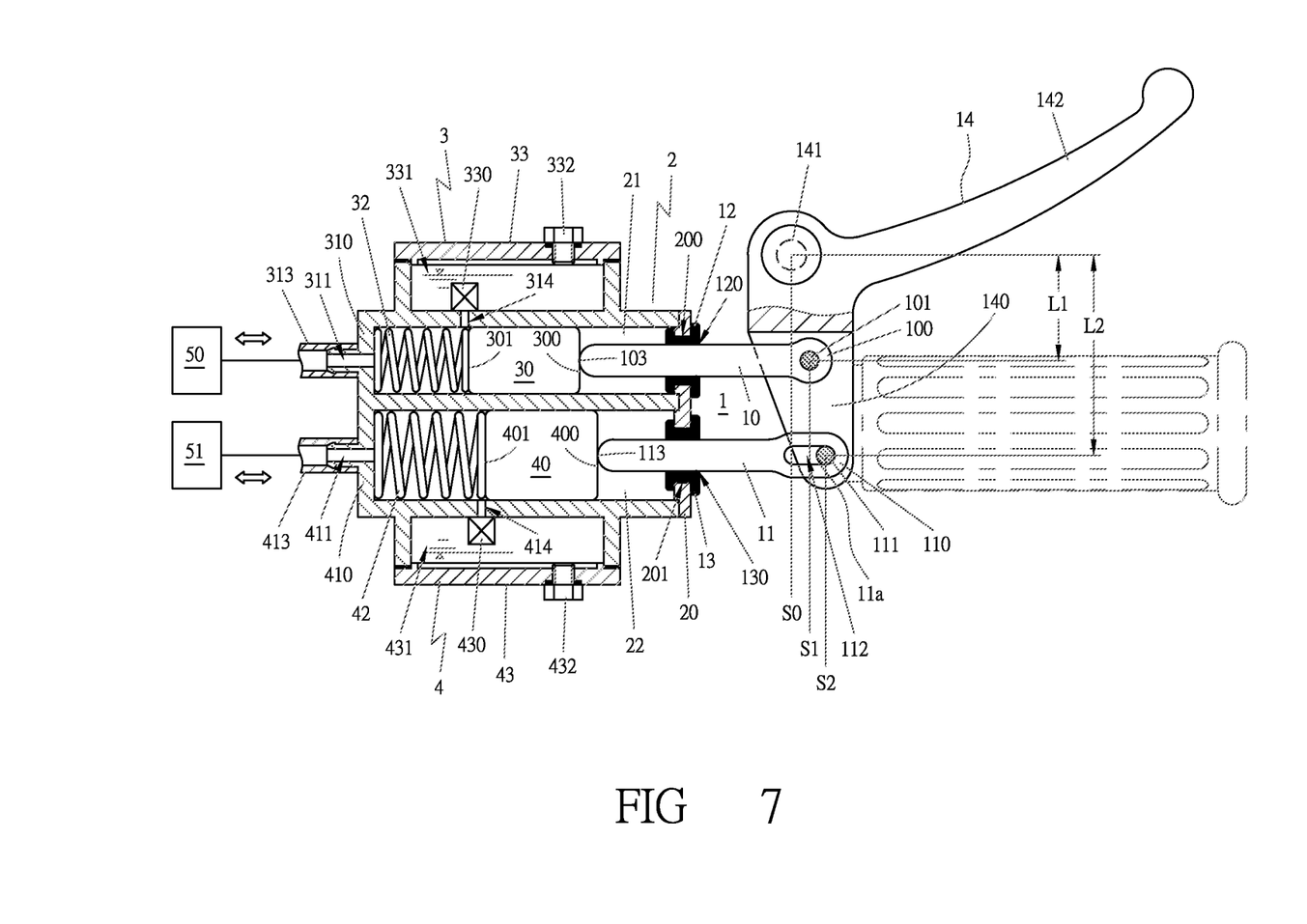
FIG. 7 is a schematic view of the third embodiment in the present invention, and showing a state in which the driving device is not activated.

FIG. 7 is a third embodiment of the present invention, which differs from the first embodiment and the second embodiment as follows: the size of the first chamber 21 for arranging the first piston 30 of the first pump mechanism 3 is different from the size of the second chamber 22 for arranging the second piston 40 of the second pump mechanism 4, and the size of the first chamber 21 is larger than the size of the second chamber 22. The purpose of this technology is that, when the driving device 1 drives the first pump mechanism 3 first and then drives the second pump mechanism 4 simultaneously after a very short time difference, the second braking force output by the second pump mechanism 4 in one unit time will be greater than the first braking force output by the first pump mechanism 3 in one unit time, this allows the front wheel brakes which are activated later than the rear wheel brake to have greater braking force.

As shown in FIGS. 1 to 4, said first replenishing device 33 of the first pump mechanism 3 and said second replenishing device 43 of the second pump mechanism 4 may be the same replenishing device, and the hydraulic fluid of the first chamber 21 of the first pump mechanism 3 and the hydraulic fluid of the second chamber 22 of the second pump mechanism 4 are simultaneously supplied by only one replenishing device.

As shown in FIGS. 1 to 4, said first pump mechanism 3 may not be provided with the first replenishing device 33, and said second pump mechanism 4 may not be provided with the second replenishing device 43, as long as sufficient hydraulic fluid is stored in the first chamber 21 and the second chamber 22, the same effect can be obtained.

Figure 1:
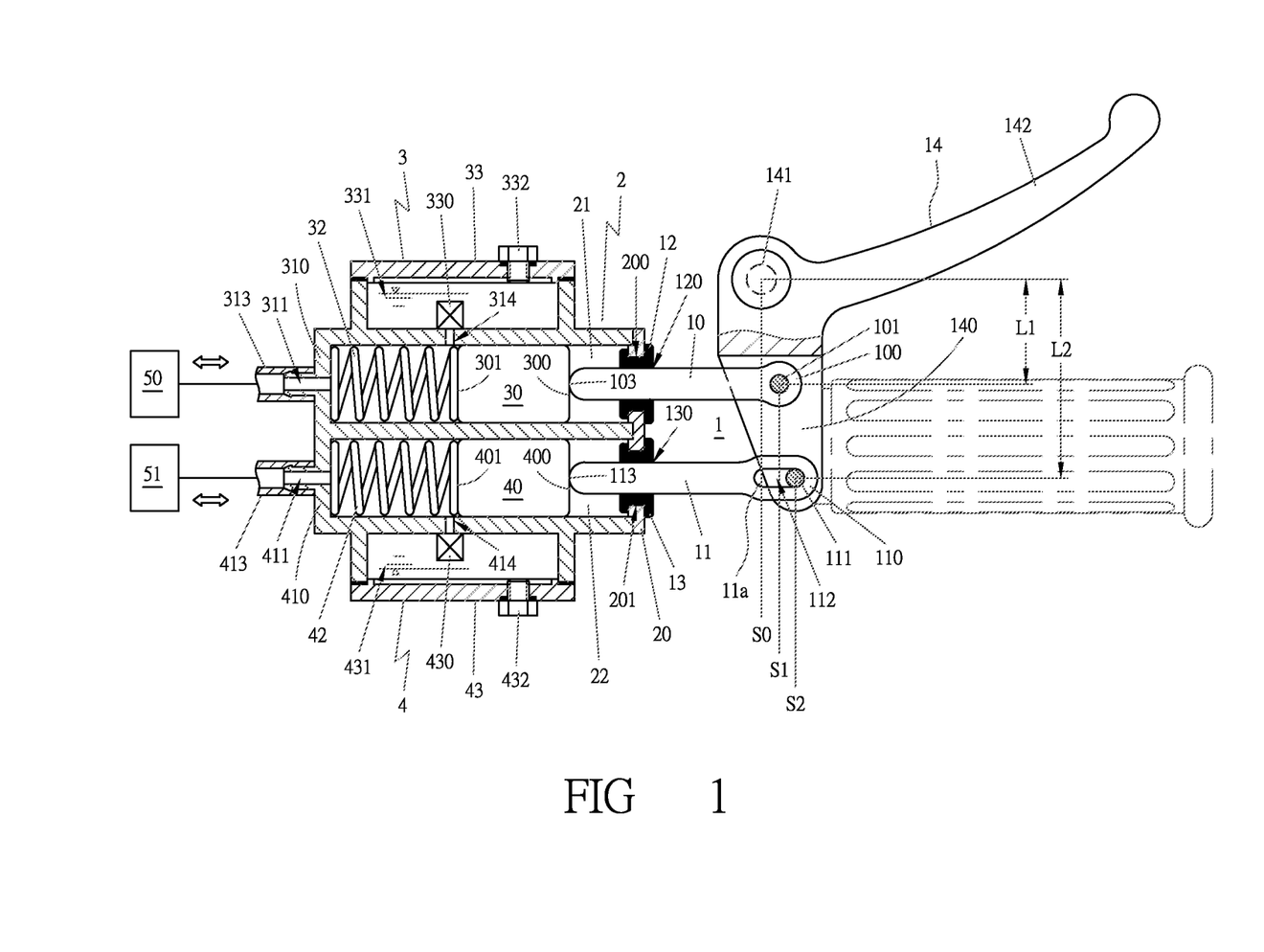
FIG. 1 is a first schematic view of the operating state of the first embodiment in the present invention, and showing a state in which the driving device is not be activated.

As shown in FIG. 1, when the driver does not activate the brake starting member 14, the rotation center point S0 of the lever shaft 141 of the brake starting member 14 (the position of the rotation center point depends on the structure of the brake starting member 14), the initial position S1 of the shaft 101 of the first driving rod 10, and the initial position S2 of the sliding shaft 111 of the second driving rod 11 are not moved. In this state, the first pump mechanism 3 and the second pump mechanism 4 will not output any hydraulic fluid.

As shown in FIG. 2, when the driver activates the driving portion 140 of the brake starting member 14 and generates a rotation arc displacement R0, the shaft 101 of the first driving rod 10 will be driven by the driving portion 140 to move to the first position S10, that is, the moving distance (arc length) is equal to the rotation radius of the shaft 101 (radius) multiplied by the rotation angle (radians); at this time, the first driving rod 10 will push the first piston 30 of the first pump mechanism 3, the first piston 30 will compresses the first elastic member 32, the hydraulic fluid in the first chamber 21 will be output to the rear wheel brake 50 through the first output duct 313, so that the rear wheel brake 50 will generate a braking force. The sliding shaft 111 of the second driving lever 11 will also be driven by the driving portion 140 to move to the first position S20, the moving distance that the sliding shaft 111 of the second driving rod 11 is moved from the initial position S2 to the first position S20 is greater than the distance that the shaft 101 of the first driving rod 10 is moved from the initial position S1 to the first position S10, because the distance from the lever shaft 141 to the sliding shaft 111 is greater than the distance from the lever shaft 141 to the shaft 101. However, since the sliding shaft 111 of the second driving lever 11 moves only in the slotted hole 112, so the second driving lever 11 will be not driven by the driving portion 140 and holds in a stationary state; at this time, the second pump mechanism 4 will not output any braking force to ensure that the rear wheel brake 50 can generate the braking force first.

As shown in FIG. 3, when the driver continues to activate the driving portion 140 of the brake starting member 14 and generates a rotation arc displacement R1 (R1>R0), the shaft 101 of the first driving rod 10 will be driven by the driving portion 140 to move to the second position S11, the moving distance of the second position S11 is greater than the moving distance of the first position S10; at this time, the first driving rod 10 will continue to push the first piston 30 of the first pump mechanism 3, the first piston 30 will continue to compresses the first elastic member 32, the hydraulic fluid in the first chamber 21 will be continuously output to the rear wheel brake 50 through the first output duct 313 to increase the braking force of the rear wheel brake 50. The sliding shaft 111 of the second driving lever 11 will also be driven by the driving portion 140 to move to the second position S21, the moving distance of the second position S21 is greater than the moving distance of the first position S20, the moving distance that the sliding shaft 111 of the second driving rod 11 is moved from the initial position S2 to the second position S21 is greater than the distance that the shaft 101 of the first driving rod 10 is moved from the initial position S1 to the second position S11, because the distance from the lever shaft 141 to the sliding shaft 111 is greater than the distance from the lever shaft 141 to the shaft 101. At this time, the second driving rod 11 will push the second piston 40 of the second pump mechanism 4, the second piston 40 will compress the second elastic member 42, the hydraulic fluid in the second chamber 22 will be output to the front wheel brake 51 through the second output duct 413, so that the front wheel brake 51 will generate a braking force to ensure that the front wheel brake 51 that is activated later can generate a larger braking force than the rear wheel brake 50 in one unit time.

As shown in FIG. 4, when the driver continues to activate the driving portion 140 of the brake starting member 14 and generates a rotation arc displacement R2 (R2>R1>R0), the shaft 101 of the first driving rod 10 will be driven by the driving portion 140 to move to the third position S12, the moving distance of the third position S12 is greater than the moving distance of the second position S11; at this time, the first driving rod 10 will continue to push the first piston 30 of the first pump mechanism 3, the first piston 30 will continue to compress the first elastic member 32, the hydraulic fluid in the first chamber 21 will be continuously output to the rear wheel brake 50 through the first output duct 313 to increase the braking force of the rear wheel brake 50. The sliding shaft 111 of the second driving lever 11 will also be driven by the driving portion 140 to move to the third position S22, the moving distance of the third position S22 is greater than the moving distance of the second position S21, the moving distance that the sliding shaft 111 of the second driving rod 11 is moved from the initial position S2 to the third position S22 is greater than the distance that the shaft 101 of the first driving rod 10 is moved from the initial position S1 to the third position S12, because the distance from the lever shaft 141 to the sliding shaft 111 is greater than the distance from the lever shaft 141 to the shaft 101. At this time, the second driving rod 11 will continue to push the second piston 40 of the second pump mechanism 4, the second piston 40 will continue to compress the second elastic member 42, the hydraulic fluid in the second chamber 22 will be continuously output to the front wheel brake 51 through the second output duct 413 to increase the braking force of the front wheel brake 51. During this process, the total braking force generated by the front wheel brake 51 is greater than the total braking force generated by the rear wheel brake 50, so when the driver activates a larger degree brake, the present invention can ensure that the front wheel brake 51 can generate a braking force greater more than the rear wheel brake 50 to protect the safety of the driver.

In this way, the driver can cause the first pump mechanism 3 and the second pump mechanism 4 to generate the time-difference braking force by only one braking operation, and the rear wheel brake 50 and the front wheel brake 51 will correspondingly generate a time-difference braking action. Furthermore, the second pump mechanism 4 that is activated later can generate a braking force greater than the first pump mechanism 3 that is activated first in a very short time, and the front wheel brake that is activated later have a better braking force and braking efficiency than the rear wheel brake that is started first.

Figure 5:
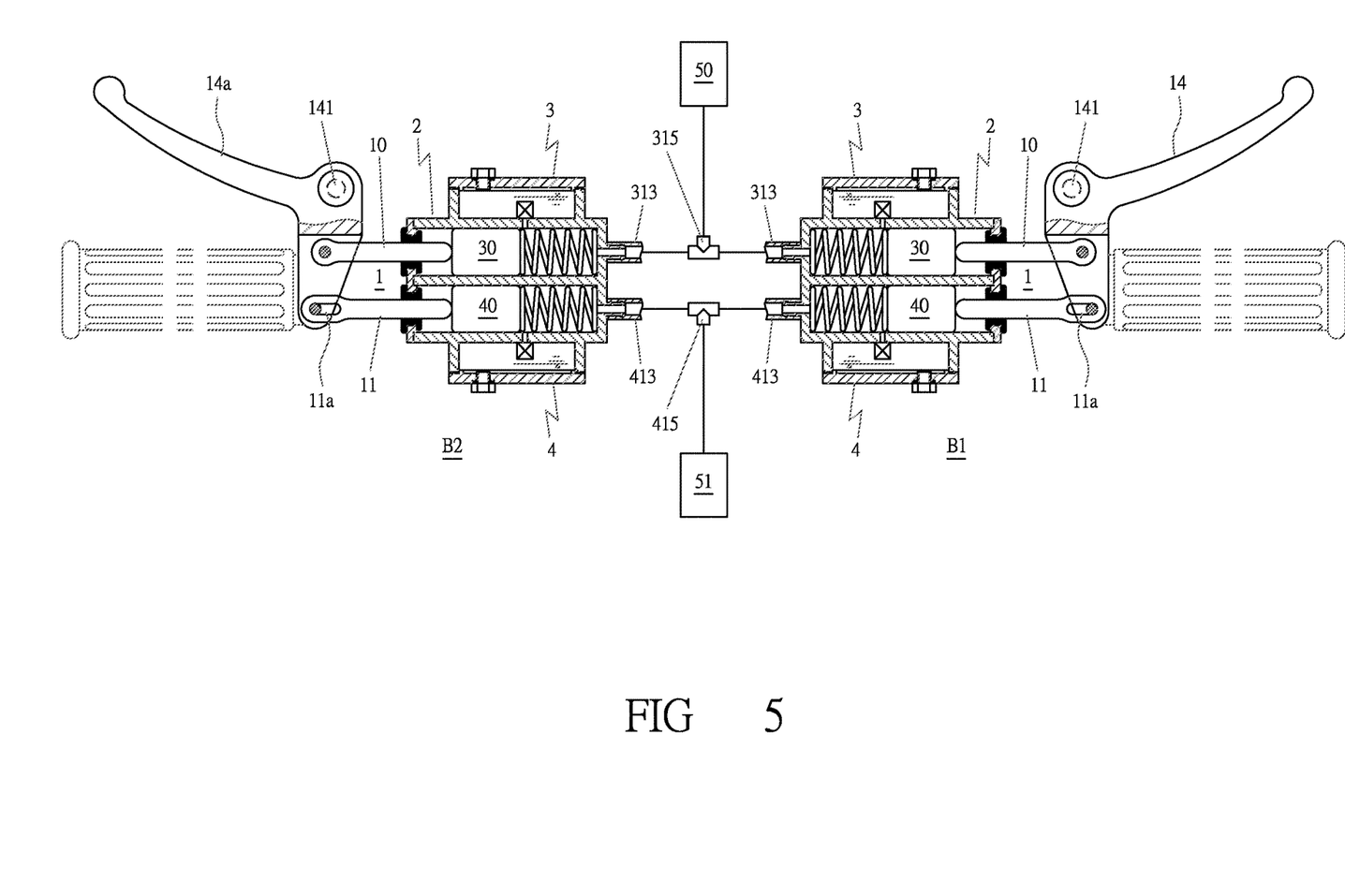
FIG. 5 is a schematic view of the first embodiment in the present invention, and showing two sets of hydraulic-type time-difference brake apparatus.

The present invention can provide at least one set of hydraulic-type time-difference brake apparatus on the vehicle with handles, such as bicycles, locomotives, electric scooters, and the like. As shown in FIG. 5, this embodiment is provided with a first hydraulic-type time-difference brake apparatus B1 and a second hydraulic-type time-difference brake apparatus B2, which are driven by the brake starting member 14 and the brake starting member 14a, respectively. The first output ducts 313 of the first pump mechanisms 3 of the two hydraulic-type time-difference brake apparatuses B1, B2 are connected together by a connection valve 315, the hydraulic fluid in each of the first chamber 31 can be output to the rear wheel brake 50 at the same time or separately; the second output ducts 413 of the second pump mechanisms 4 of the two hydraulic-type time-difference brake apparatuses B1, B2 are connected together by a connection valve 415, the hydraulic fluid in each of the second chamber 41 can be output to the front wheel brake 51 at the same time or separately. In this way, with a plurality of hydraulic-type time-difference brake apparatuses, even if one hydraulic-type time-difference brake apparatus suddenly breaks down, the brake function of the vehicle will not be invalid, so as to improve driving safety.

This invention only needs to activate one braking operation by the driver, the driving device 1 can cause the first pump mechanism 3 and the second pump mechanism 4 to output the time-difference braking force. For various rear-wheel drive vehicles, the rear wheel brake can first generate a braking force on the rear wheel to reduce the speed of the rear wheel, then the front wheel brake will generate a larger braking force on the front wheel more than the rear wheel after a time difference to achieve the effect of improved braking efficiency, safety and stability of the vehicle. Evidently this invention has tangible benefits and tallies with progressiveness and novelty demanded by patent laws. While the preferred embodiments of this invention have been described above, it will be recognized and understood that various modifications may be made therein and appended claims are intended to cover all such modifications that may fall within the spirit and scope of the invention.

What is claimed is:

1. A hydraulic-type time-difference brake apparatus at least comprising:
   a driving device, provided with a first driving rod, a second driving rod, a brake starting member and a housing, wherein an upper wall of said housing is provided with a first rod holder and a second rod holder, inner portions of the first rod holder and the second rod holder are respectively formed with a first chamber and a second chamber; said first driving rod passes through the first rod holder of the housing and extends into the first chamber to drive a first pump mechanism, said second driving rod passes through the second rod holder of the housing and extends into the second chamber to drive a second pump mechanism; said first driving rod is connected to the brake starting member, and the second driving rod is connected to the brake starting member by a sliding device; a sliding process of the sliding device can delay the time the brake starting member activates the second driving rod, so that a start time between the first driving rod and the second driving rod will have a time difference;
   the first pump mechanism, arranged in the first chamber of the housing, wherein said first pump mechanism is provided with a first piston and a first elastic member, an upper end of the first piston is pressed against a lower end of the first driving rod; so the first piston of the first pump mechanism can be driven through the first driving rod, and a first braking force can be output to a rear wheel brake of the vehicle;
   the second pump mechanism, arranged in the second chamber of the housing, wherein said second pump mechanism is provided with a second piston and a second elastic member, an upper end of the second piston is pressed against a lower end of the second driving rod; so the second piston of the second pump mechanism can be driven through the second driving rod after a very short time difference, and a second braking force can be output to a front wheel brake of the vehicle;
   the driver can cause the rear wheel brake and the front wheel brake to generate a time-difference brake by only one braking operation, the rear wheel brake can first generate a braking force on the rear wheel to reduce the speed of the rear wheel, then the front wheel brake will generate a larger braking force on the front wheel more than the rear wheel after a time difference to improve the safety of the vehicle.

2. The hydraulic-type time-difference brake apparatus according to claim 1, wherein said brake starting member is provided with a driving portion, the upper end of said first driving rod is pivoted with a shaft, the shaft of the first driving rod is connected to the driving portion of the brake starting member, said first rod holder is made of rubber or silicone, the upper wall of the housing is provided with a first rod hole, and the first rod holder is mounted in the first rod hole; said sliding device is provided with a slotted hole and a sliding shaft on the second driving rod, the sliding shaft is connected to the driving portion of the brake starting member, and the sliding shaft can slide in the slotted hole, said second rod holder is made of rubber or silicone, the upper wall of the housing is provided with a second rod hole, and the second rod holder is mounted in the second rod hole.

3. The hydraulic-type time-difference brake apparatus according to claim 1, wherein said brake starting member is provided with a driving portion, a shaft is pivoted between said first driving rod and said driving portion, and a shaft is pivoted between the second driving rod and said driving portion; said brake starting member is provided with a lever shaft, and a pressing handle is mounted on one side of the lever shaft, the lever shaft is a leverage point between the pressing handle and the driving portion; since a first length between the shaft of the first driving rod and the lever shaft is different from a second length between a sliding shaft of the second drive rod and the lever shaft, the arc displacement generated by the two is also different, when the pressing handle is pressed by driver, the braking forces of the first driving rod and the second driving rod outputted to the first pump mechanism and the second pump mechanism are different.

4. The hydraulic-type time-difference brake apparatus according to claim 1, wherein said first piston moves within the first chamber of the housing, said first chamber is internally filled with hydraulic fluid, the first elastic member is disposed in the first chamber, the first elastic member is located between the lower end of the first piston and the lower wall of the first chamber, the lower wall of said first chamber is formed with a first hole, the first hole is provided with a first output duct, so that the a first output pipe can output the hydraulic fluid inside the first chamber to the rear wheel brake, and to drive the rear wheel brake to generate a braking force; said second piston moves within the second chamber of the housing, said second chamber is internally filled with hydraulic fluid, the second elastic member is disposed in the second chamber, the second elastic member is located between the lower end of the second piston and the lower wall of the second chamber, the lower wall of said second chamber is formed with a second hole, the second hole is provided with a second output duct, so that a second output pipe can output the hydraulic fluid inside the second chamber to the front wheel brake, and to drive the front wheel brake to generate a braking force.

5. The hydraulic-type time-difference brake apparatus according to claim 4, wherein said first chamber is provided with a first replenishing device, the first replenishing device is provided with a first regulating valve, a first connecting duct is formed between the first chamber and the first replenishing device, said first regulating valve can adjust or supplement the hydraulic fluid in the first chamber, the first replenishing device is provided with a first fluid storage tank, the first fluid storage tank is provided with a first plug, the hydraulic fluid in the first fluid storage tank can be replenished or replaced through the first plug, a gas temporary storage space is disposed in the first fluid storage tank, so that the air bubbles generated from the first chamber can be transported to the gas temporary storage space of the first fluid storage tank through the first output duct and the first regulating valve to maintain the quality and temperature of the hydraulic fluid in the first chamber; said second chamber is provided with a second replenishing device, the second replenishing device is provided with a second regulating valve, a second connecting duct is formed between the second chamber and the second replenishing device, said second regulating valve can adjust or supplement the hydraulic fluid in the second chamber, the second replenishing device is provided with a second fluid storage tank, the second fluid storage tank is provided with a second plug, the hydraulic fluid in the second fluid storage tank can be replenished or replaced through the second plug, a gas temporary storage space is disposed in the second fluid storage tank, so that the air bubbles generated from the second chamber can be transported to the gas temporary storage space of the second fluid storage tank through the second output duct and the second regulating valve to maintain the quality and temperature of the hydraulic fluid in the second chamber.

6. The hydraulic-type time-difference brake apparatus according to claim 1, wherein said sliding device is provided with a slotted hole and a sliding shaft, said slotted hole may be mounted at an upper end of said second driving rod, and said sliding shaft may be mounted on a driving portion of the brake starting member; or said slotted hole may be mounted on the driving portion of the brake starting member, and said sliding shaft may be mounted at the upper end of the second driving rod; said sliding shaft can slide in the slotted hole, so that the driving portion of the brake starting member can drive the second driving rod to generate a time-difference displacement.

7. The hydraulic-type time-difference brake apparatus according to claim 1, wherein said brake starting member is provided with a lever shaft, a second length between a sliding shaft of the second drive rod and the lever shaft is greater than a first length between a shaft of the first driving rod and the lever shaft; when the brake starting member rotates, the sliding shaft of the second driving rod will generate an arc displacement and a moment of force larger than the shaft of the first driving rod.

8. The hydraulic-type time-difference brake apparatus according to claim 1, wherein the driving portion of the brake starting member of the driving device can push the first driving rod to move, the first piston of the first pump mechanism will compress the first elastic member and outputs a first braking force to the rear wheel brake; when the first driving rod moves a distance in a short time, the driving portion will synchronously push the second driving rod to move, the second piston of the second pump mechanism will compress the second elastic element and outputs a second braking force to the front wheel brake; so the front wheel brake and the rear wheel brake can generate braking force respectively in a short time difference.

9. The hydraulic-type time-difference brake apparatus according to claim 8, wherein the distance that the driving portion pushes the second driving rod to move is greater than the distance that the driving portion pushes the first driving rod to move, the more brakes the driver adds, the greater the difference between the two distances; this allows the second driving rod to generate a larger moving distance, and the second braking force outputted by the second pump mechanism to the front wheel brake is greater than the first braking force outputted by the first pump mechanism to the rear wheel brake to ensure the safety.

10. A hydraulic-type time-difference brake apparatus at least comprising:

a driving device, provided with a first driving rod, a second driving rod, a brake starting member and a housing, wherein an upper wall of said housing is provided with a first rod holder and a second rod holder, inner portions of the first rod holder and the second rod holder are respectively formed with a first chamber and a second chamber; said first driving rod passes through the first rod holder of the housing and extends into the first chamber to drive a first pump mechanism, said second driving rod passes through the second rod holder of the housing and extends into the second chamber to drive a second pump mechanism; said first driving rod is connected to the brake starting member, and the second driving rod is connected to the brake starting member by a sliding device; a sliding process of the sliding device can delay the time the brake starting member activates the second driving rod, so that a start time between the first driving rod and the second driving rod will have a time difference;

the first pump mechanism, arranged in the first chamber of the housing, wherein said first pump mechanism is provided with a first piston and a first elastic member, an upper end of the first piston is pressed against a lower end of the first driving rod; so the first piston of the first pump mechanism can be driven through the first driving rod, and a first braking force can be output to a rear wheel brake of the vehicle; said first chamber is provided with a first replenishing device, the first replenishing device is provided with a first regulating valve, a first connecting duct is formed between the first chamber and the first replenishing device, said first regulating valve can adjust or supplement hydraulic fluid in the first chamber, the first replenishing device is provided with a first fluid storage tank, the first fluid storage tank is provided with a first plug, the hydraulic fluid in the first fluid storage tank can be replenished or replaced through the first plug, a gas temporary storage space is disposed in the first fluid storage tank, so that air bubbles generated from the first chamber can be transported to the gas temporary storage space of the first fluid storage tank through the first connecting duct and the first regulating valve to maintain quality and temperature of the hydraulic fluid in the first chamber;

the second pump mechanism, arranged in the second chamber of the housing, wherein said second pump mechanism is provided with a second piston and a second elastic member, an upper end of the second piston is pressed against a lower end of the second driving rod; so the second piston of the second pump mechanism can be driven through the second driving rod after a very short time difference, and a second braking force can be output to a front wheel brake of the vehicle; said second chamber is provided with a second replenishing device, the second replenishing device is provided with a second regulating valve, a second connecting duct is formed between the second chamber and the second replenishing device, said second regulating valve can adjust or supplement hydraulic fluid in the second chamber, the second replenishing device is provided with a second fluid storage tank, the second fluid storage tank is provided with a second plug, the hydraulic fluid in the second fluid storage tank can be replenished or replaced through the second plug, a gas temporary storage space is disposed in the second fluid storage tank, so that air bubbles generated from the second chamber can be transported to the gas temporary storage space of the second fluid storage tank through the second connecting duct and the second regulating valve to maintain quality and temperature of the hydraulic fluid in the second chamber;

therefore, the driver can cause the rear wheel brake and the front wheel brake to generate a time-difference brake by only one braking operation, the rear wheel brake can first generate a braking force on the rear wheel to reduce the speed of the rear wheel, then the front wheel brake will generate a larger braking force on the front wheel more than the rear wheel after a time difference to improve the safety of the vehicle.

11. The hydraulic-type time-difference brake apparatus according to claim 10, wherein said brake starting member is provided with a driving portion, the upper end of said first driving rod is pivoted with a shaft, the shaft of the first driving rod is connected to the driving portion of the brake starting member, said first rod holder is made of rubber or silicone, the upper wall of the housing is provided with a first rod hole, and the first rod holder is mounted in the first rod hole; said sliding device is provided with a slotted hole and a sliding shaft on the second driving rod, the sliding shaft is connected to the driving portion of the brake starting member, and the sliding shaft can slide in the slotted hole, said second rod holder is made of rubber or silicone, the upper wall of the housing is provided with a second rod hole, and the second rod holder is mounted in the second rod hole; a shaft is pivoted between said first driving rod and said driving portion, and a shaft is pivoted between the second driving rod and said driving portion; said brake starting member is provided with a lever shaft, and a pressing handle is mounted on one side of the lever shaft, the lever shaft is a leverage point between the pressing handle and the driving portion; since a first length between the shaft of the first driving rod and the lever shaft is different from a second length between the sliding shaft of the second drive rod and the lever shaft, the arc displacement generated by the two is also different, when the pressing handle is pressed by driver, the braking forces of the first driving rod and the second driving rod outputted to the first pump mechanism and the second pump mechanism are different.

12. The hydraulic-type time-difference brake apparatus according to claim 10, wherein said first piston moves within the first chamber of the housing, said first chamber is internally filled with hydraulic fluid, the first elastic member is disposed in the first chamber, the first elastic member is located between the lower end of the first piston and the lower wall of the first chamber, the lower wall of said first chamber is formed with a first hole, the first hole is provided with a first output duct, so that a first output pipe can output the hydraulic fluid inside the first chamber to the rear wheel brake, and to drive the rear wheel brake to generate a braking force; said second piston moves within the second chamber of the housing, said second chamber is internally filled with hydraulic fluid, the second elastic member is disposed in the second chamber, the second elastic member is located between the lower end of the second piston and the lower wall of the second chamber, the lower wall of said second chamber is formed with a second hole, the second hole is provided with a second output duct, so that a second output pipe can output the hydraulic fluid inside the second chamber to the front wheel brake, and to drive the front wheel brake to generate a braking force.

13. The hydraulic-type time-difference brake apparatus according to claim 10, wherein said sliding device is provided with a slotted hole and a sliding shaft, said slotted hole may be mounted at an upper end of said second driving rod, and said sliding shaft may be mounted on a driving portion of the brake starting member; or said slotted hole may be mounted on the driving portion of the brake starting member, and said sliding shaft may be mounted at the upper end of the second driving rod; said sliding shaft can slide in the slotted hole, so that the driving portion of the brake starting member can drive the second driving rod to generate a time-difference displacement.

14. The hydraulic-type time-difference brake apparatus according to claim 10, wherein said brake starting member is provided with a lever shaft, a second length between a sliding shaft of the second drive rod and the lever shaft is greater than a first length between a shaft of the first driving rod and the lever shaft; when the brake starting member rotates, the sliding shaft of the second driving rod will generate an arc displacement and a moment of force larger than the shaft of the first driving rod.

15. The hydraulic-type time-difference brake apparatus according to claim 10, wherein the driving portion of the brake starting member of the driving device can push the first driving rod to move, the first piston of the first pump mechanism will compress the first elastic member and outputs a first braking force to the rear wheel brake; when the first driving rod moves a distance in a short time, the driving portion will synchronously push the second driving rod to move, the second piston of the second pump mechanism will compress the second elastic element and outputs a second braking force to the front wheel brake; so the front wheel brake and the rear wheel brake can generate braking force respectively in a short time difference.

* * * * *